United States Patent [19]
Foltz et al.

[11] Patent Number: 5,978,813
[45] Date of Patent: Nov. 2, 1999

[54] SYSTEM FOR PROVIDING SYNCHRONIZATION BETWEEN A LOCAL AREA NETWORK AND A DISTRIBUTING COMPUTER ENVIRONMENT

[75] Inventors: Richard C. Foltz, Round Rock; Sy Long Lin, Austin; John Vincent Meegan, Austin; Syed Abdul Wadood, Austin, all of Tex.

[73] Assignee: International Business Machines Corporation, Armonk, N.Y.

[21] Appl. No.: 08/533,296

[22] Filed: Sep. 25, 1995

[51] Int. Cl.$^6$ .................................................. G06F 17/30
[52] U.S. Cl. ............................................................ 707/201
[58] Field of Search ........................ 395/200.09, 200.01, 395/619; 707/201

[56] References Cited

U.S. PATENT DOCUMENTS

| | | | |
|---|---|---|---|
| 5,214,700 | 5/1993 | Pinkas et al. | 380/25 |
| 5,276,735 | 1/1994 | Boebert et al. | 380/21 |
| 5,305,456 | 4/1994 | Boitana | 395/186 |
| 5,423,037 | 6/1995 | Hvasshovd | 707/202 |
| 5,555,404 | 9/1996 | Torbjærnsen et al. | 707/202 |
| 5,617,568 | 4/1997 | Ault et al. | 707/101 |

OTHER PUBLICATIONS

Understanding DCE, 1992, W. Rosenberry et al., Chapter 1, "DCE: The Network as Computer".
Understanding DCE, 1992, W. Rosenberry et al., Chapter 5, "DCE Security Service: Protecting Resources".

*Primary Examiner*—Robert B. Harrell
*Assistant Examiner*—Kenneth R. Coulter
*Attorney, Agent, or Firm*—Jeffrey S. LaBaw; Lisa B. Yociss; Andrew J. Dillon

[57] ABSTRACT

A database synchronization system for synchronizing a plurality of local databases in a plurality of distributed computing systems is disclosed. The plurality of distributed computing systems form a distributed computing environment (DCE). The synchronization system includes a system server, a registry database, coupled to the system server, a local area network (LAN) synchronization server, coupled to the system server, a LAN server synchronization library, coupled to the system server, and a LAN server, coupled to the LAN synchronization server and selected ones of the plurality distributed computing systems forming a LAN. Synchronization between the LAN and the DCE registry occurs when registry modifications in the registry database affecting at least one of the plurality of local LAN databases invokes the LAN server synchronization library to synchronize the affected database. The synchronization system utilizes a registry database coupled to each of the local databases. A primary replica is coupled to the registry database that synchronizes each local database within the DCE with the registry database. A secondary replica is then coupled to the primary replica, that synchronizes at least one local area network (LAN) server that includes selected ones of the plurality of computing systems and their respective databases with the registry database.

51 Claims, 5 Drawing Sheets

SYSTEM FOR PROVIDING SYNCHRONIZATION BETWEEN A LOCAL AREA NETWORK AND A DISTRIBUTING COMPUTER ENVIRONMENT

BACKGROUND OF THE INVENTION

1. Technical Field

The present invention relates, generally, to a server system for use with a plurality of computing devices and, specifically, to a server system that provides synchronization between dissimilar computer server environments. More specifically still, the present invention relates to a synchronization system used in a local area network matched to a distributed computing environment.

2. Description of the Related Art

Data processing and computer systems are well known in the arts. More specifically, the use of multiple processing systems tied one to another to form a local area network (LAN) are also well know. A broader application of LANs is known as a distributed computing environment (DCE) and is capable of handling a greater number of computer systems within the server system than is typically capable in a LAN server system.

As a business or enterprise first develops, it is typically small and requires either a single computer or merely a couple of computers to provide all the data processing needs of that particular enterprise. As the enterprise grows, additional data processing systems are added and eventually a LAN is added with a LAN server used to provide system security and to provide synchronization of communication between the various computers on the LAN. As the enterprise grows still bigger, the abilities of the LAN server are taxed and the enterprise is ready for a distributing computing environment (DCE). The DCE security architecture usually is substantially different than that for a LAN server and the synchronization process is also more complex due to the added resources and the abilities required of the DCE server.

The DCE security server typically consists of the following services: registry service, authentication service, privilege service, and access control list. Registry service is provided to maintain the registry database, which is a replicated database of principals, groups, organizations, accounts and administrative policies. Authentication service handles user authentication or the process of verifying that principals are correctly identified. The authentication service also issues tickets that a principal uses to access remote services. The ticket contains data that is presented by the principal requesting the service to the principal providing the service. Privileged service supplies the user's privilege attributes, which are used to ensure that a principal has the rights to perform requested operations. Access control list (ACL) facility determines the access rights to an object based on the users privilege attributes.

The DCE security further includes a DCE host daemon (DCED) that acts as the security client. The registry, authentication and privileged services are implemented as a single daemon, which is typically referred to as the security server. The actual granting of access rights to an object is performed by the ACL facility; the ACL edit tool establishes the access permissions for an object. The authentication service consists of a registry database, security servers, and security clients. A security client communicates with a security server to request information and operations. The security server accesses the registry database to perform queries and updates and to validate user logins. To gain access to the registry database, the authentication service must talk to the registry service.

FIG. 1 represents a block diagram of the relationship between the security clients 11, servers 13, and a registry database 15. It is also an example of the security server clients requesting a database operation.

Registry database 15 contains information similar to that found in a UNIX group and password files. It contains the following items: principals, groups, organizations, and accounts. Principals are included and are the users of the system. Principals can be interactive principals, such as human users, or non interactive, such as servers, machines, and cells. Principals can be associated with access permissions. Groups are a collection of principals that are identified by group name. Groups can be associated with access permissions. Organizations are collections of principals; these principals are identified by an organization name. Organizations define the policies associated with the principals in the registries. Organizations cannot be associated with access permissions. Accounts contain the passwords and accounting information that allow principals authenticated access to objects within the cell.

Registry database 15 also contains information on policies and properties for the registry as a whole and for organizations. Policy and properties regulate such things as password length, format and certain authentication of requirements.

The collection of principals, groups, organizations and accounts controlled by a registry database is an entity known as a cell. Authenticated communication is possible between cells only if those cells have special accounts in the registry database at the cell with which they wish to communicate. These special accounts setup a cross cell authentication, which allows principals from one cell authenticated access to another cell.

Adding LAN Server servers to DCE system or DCE system servers to LAN Server can be complex and troublesome for the enterprise, but to minimize such trauma, it is quite common to transition gradually from a LAN server to a DCE server environment where the LAN and the DCE systems have overlapping capabilities and operation. Additionally, the LAN server may be merely a subset of the DCE environment. In either event, it is helpful to have cross compatibility between the two systems so as to minimize expense and avoid system incompatability.

One example of a LAN server is the OS/2 LAN server 4.0, provided by International Business Machines Corporation. LAN server 4.0 provides the enterprise with functionality for a large network. The current LAN server base can continue to exist and evolve as a separate product to provide file and print sharing services for small to medium work groups. The LAN server also allows the base functionality to extend to large enterprises by replacing the LAN server base directory and security structure with the equivalent DCE services. This provides for a transition from the small to medium size work groups to the large DCE type environments.

One limitation of transitioning from the OS/2 LAN Server 4.0 system to a more robust DCE enterprise server is that the synchronization process must be fully compatible with the DCE security server system. Unfortunately, there exist incompatibilities with prior LAN server systems and with current DCE security servers that do not permit merely combining the two systems to arrive at a common system for the two environments. Specifically, the DCE security server maintains a working copy of the registry database at all times. The registry database can be replicated within its cell.

Each instance of a security server in a cell maintains a working copy of the database. The combination of a security server and its data, the registry database, is referred to as a "replica." Typically, the security server creates several replicas in a cell to enhance performance and reliability. The task of keeping the cell replicas consistent is handled automatically by the security servers. Any changes made to the data are automatically reflected in all replicas. Within the replicas there is a hierarchy of one master replica or primary replica and several secondary replicas.

In a DCE enterprise that includes a LAN Server, two separate systems must be maintained for installing a domain controller because the Registr synchronization process (RSP) cannot run on the same machine on which the DCE security server is installed. The RSP within the LAN server then becomes a modified version of secondary security server in the DCE enterprise. This RSP registers itself as a secondary replica for the purposes of receiving timely updates from the primary replica. Since the DCE security architecture does not allow more than one replica to run on the same machine, the current version of the RSP cannot run on a machine that has a primary or a secondary replica installed. Because of this, there is a need for a solution that allows both the LAN server RSP and the DCE security server to co-exist on one system without conflicting with one another in their generation of replicas and synchronization of registries.

SUMMARY OF THE INVENTION

It is therefore one object of the present invention is to provide a server system for use with a plurality of computing devices.

It is another object of the present invention is to provide a server system that provides synchronization between dissimilar computer server environments.

It is yet another object of the present invention is to provide a registry database synchronization system used in a local area network matched to a distributed computing environment.

According to the present invention, a database synchronization system for synchronizing a plurality of local databases in a plurality of distributed computing systems is disclosed. The plurality of distributed computing systems form a distributed computing environment (DCE). The synchronization system includes a system server, a registry database, coupled to the system server, a local area network (LAN) synchronization server, coupled to the system server, a LAN server synchronization library, coupled to the system server, and a LAN server, coupled to the LAN synchronization server and selected ones of the plurality distributed computing systems forming a LAN. Synchronization between the LAN and the DCE registry occurs when registry modifications in the registry database affecting at least one of the plurality of local LAN databases invokes the LAN server synchronization library to synchronize the affected database.

The synchronization system utilizes a registry database coupled to each of the local databases. A primary replica is coupled to the registry database that synchronizes each local database within the DCE with the registry database. A secondary replica is then coupled to the primary replica, that synchronizes at least one local area network (LAN) server that includes selected ones of the plurality of computing systems and their respective databases with the registry database.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
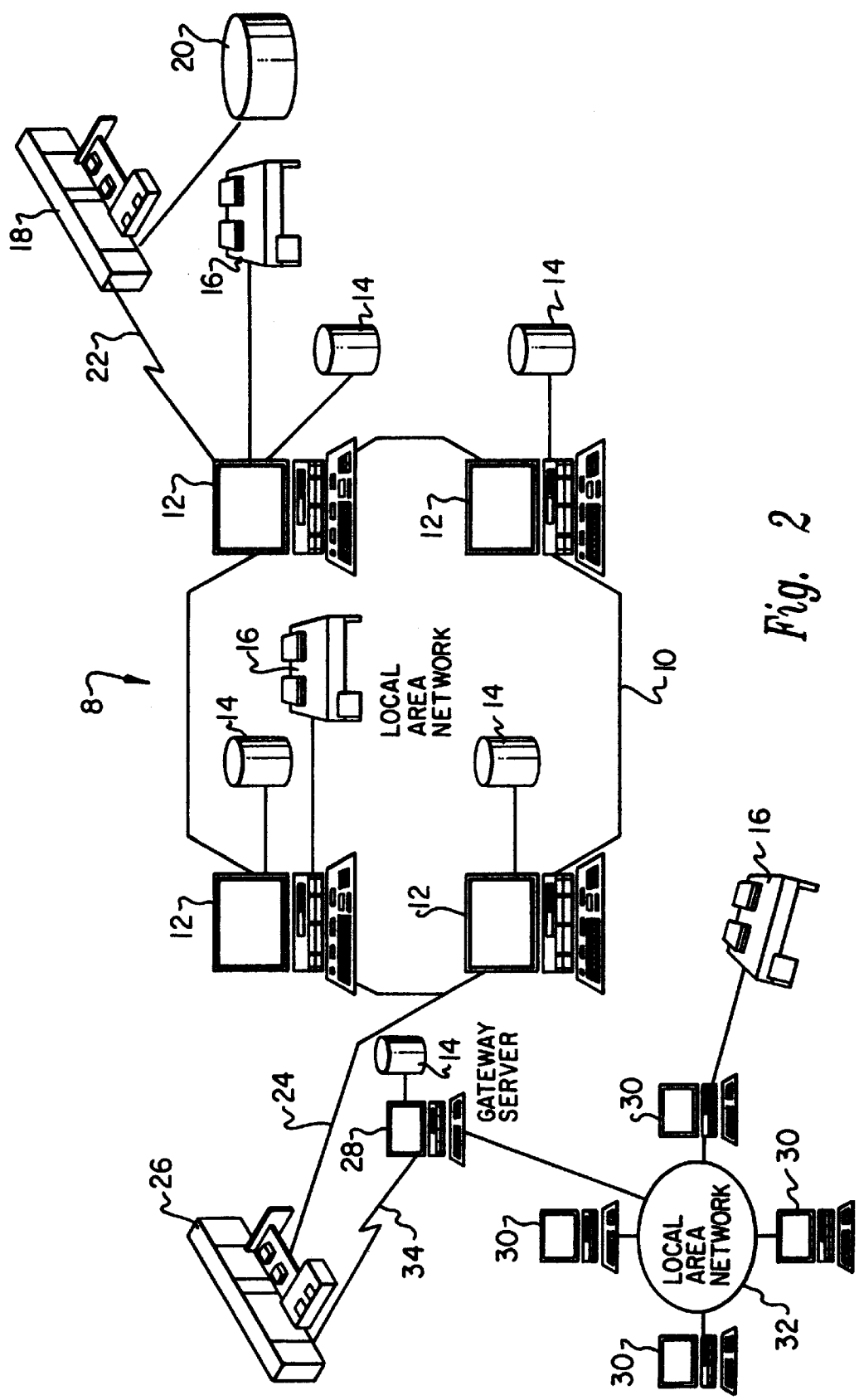
FIG. 2 depicts a pictorial representation of a distributed data processing system according to the present invention.

With reference now to the figures, and in particular with reference to FIG. 2, there is depicted a pictorial representation of a distributed data processing system 8 or distributed computing system (DCE), which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurale ity of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within distributed data processing system 8, in accordance with the method and system of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 2, it may be seen that distributed data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. A second Local Area Network (LAN) 32 may be coupled to Local Area Network (LAN) 10 via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored.

Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a data object or document stored in another portion of data processing network 8. In order to maintain a semblance of order within the documents stored within data processing network 8 it is often desirable to implement a one-way access control program. This is generally accomplished by listing those users authorized to access each individual data object or document, along with the level of authority that each user may enjoy with regard to a document within a Resource Manager or Library Service. In this manner, the data processing procedures and documents may be accessed by enrolled users within distributed data processing system 8 and periodically "locked" to prevent access by other users. It is the system administrator who typically controls access and performs modifications for security. It is to this end that a need for an improved DCE server having LAN server capabilities is needed so to be able to maintain data registry synchronization and consistency.

Figure 3:
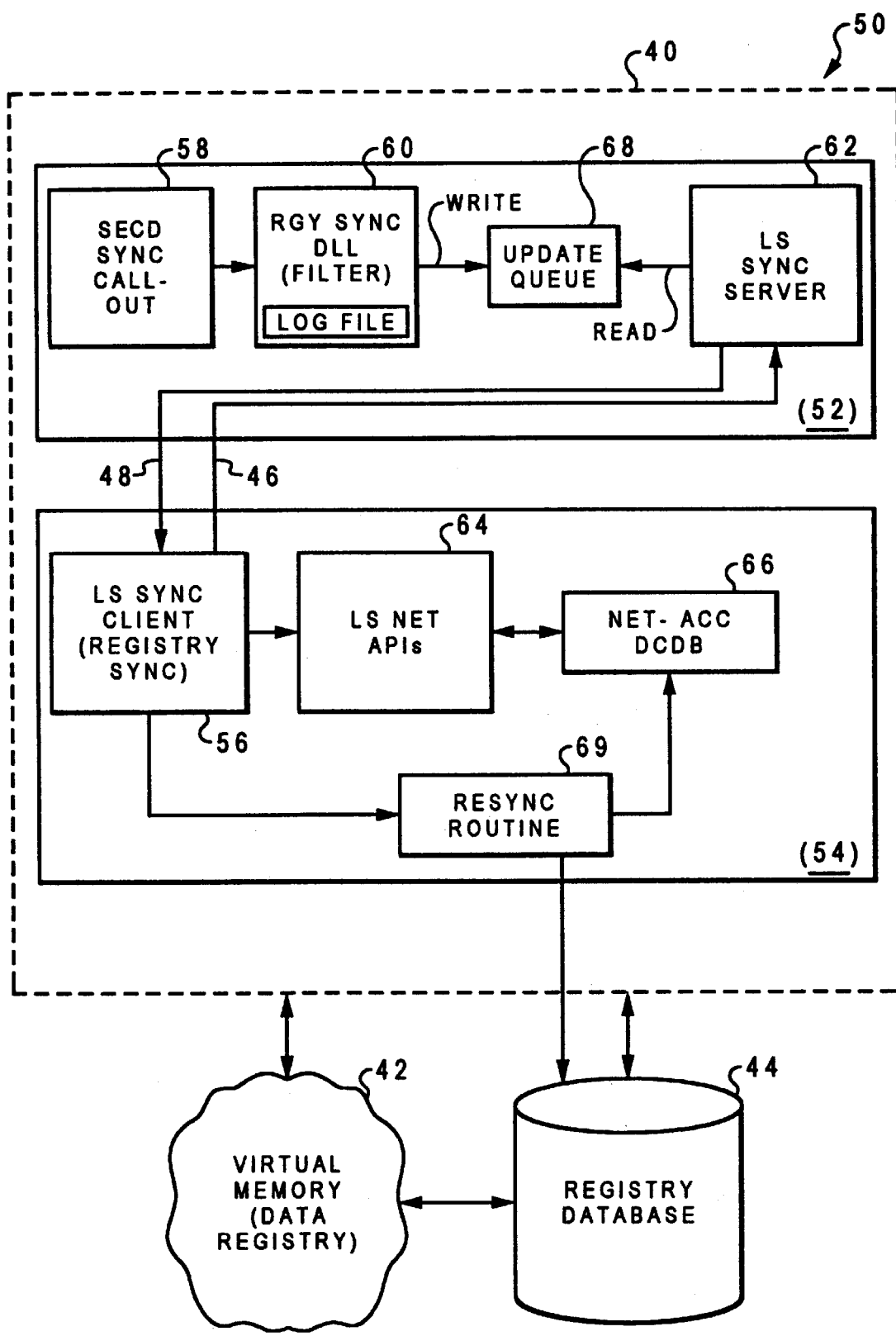
FIG. 3 is a block diagram of the DCE cell with security server according to the present invention.

The DCE of FIG. 2, further includes a security server. An example of a security server arrangement is illustrated in the diagram of FIG. 3. Security server 40 maintains a working copy of the registry database in virtual memory 42 and a permanent copy on disk 44. All these updates operate on the same copy that is in virtual memory. The server uses the copy that is on disk to initialize the copy in virtual memory when the server starts up. An atomic update log is used to guarantee the database state in the event of server failure. The security server periodically saves its entire database from virtual memory to disk.

The registry database can be replicated within its cell. Each instance of a security server in a cell maintains a working copy of the database. The combination of a security server and its registry database is referred to as a replica. Within a cell, there is one primary replica, which accepts updates to its database from clients, and several secondary replicas, which accept only reads from clients.

In DCE security server systems, only one replica could be maintained on a particular machine within a DCE cell. In a prior version of the LAN Server with limited DCE server capabilities, the RSP registers itself as a secondary replica for the purposes of receiving timely updates from the primary replica. Since the DCE security architecture does not allow more than one replica to run on the same machine, the current version of RSP cannot run on a machine that has a primary or a secondary replica currently installed. The following explains why two security replicas cannot run on the same machine.

The primary and secondary replicas register the same set of interfaces. When a remote procedure call (RPC) is made between the primary replica and a secondary replica, the same object Universal Unique Identifier (UUID) or architecturally defined security server UUID, is used by both the primary and the secondary replicas to associate it with the RPC handle. The primary replica creates this object UUID and all the secondary replicas obtain the object UUID from the primary replica. Assume that the secondary replica uses the RPC call "rpc_ep_register_no_replace( )" to register its interfaces so that it does not replace the end point map entry created by the primary replica for the same interface. If the primary and secondary replicas are running on the same machine and the primary replica makes a RPC call to the secondary replica, the local end point mapper will resolve the RPC binding handle to the primary replica's RPC routine instead of the secondary replica's routine. This problem occurs because the interface ID, object UUID, and network address for the two entries are identical. The following is an example of the two entries that exist in the end point map for the same interface registered by the primary and secondary replicas running on the same machine:

(interface registered by primary replica)

<object> 53a7c2c0-3149-11ce-bc2f=10005a8d 1971

<interface id> 4c878280-5000-0000-0d00-028714000000,1.0

<string binding>ncacn_ip_tcp:129.35.68.105`[2254]

<annotation> DCE user registry (interface registered by secondary replica)

<object> 53a7c2c0-3149-11ce-bc2f-10005a8d1971

<interface id> 4c878280-5000-0000-0d00-028714000000,1.0

<string binding>ncacn ip tcp:129.35.68.105[2307]

<annotation> DCE user registry

The cell security ID "53a7c2c0-3149-11ce-bc2f-10005a8d1971" is the object UUID used by both the interfaces.

To overcome this problem, a DCE security server daemon (secd.exe) provides a callout capability for supporting the registry synchronization function required by the LAN Server 62. The registry synchronization DLL 60 provides the callouts required by LAN server enterprise. The DCE security server 58 includes callouts to the registry synchronization DLL 60 that keeps the LAN server user and group database 66 synchronized with the DCE registry 44. These callouts, or application programming interfaces (APIs), are built in a separate dynamically linked library (DLL). The DCE security server 58 calls these APIs only if the registry synchronization DLL 60 is installed and if registry synchronization is enabled.

The callout ability tests for the presence of a LAN Server registry synchronization DLL 60. If one is found, entry points, or callouts, are called for each type of registry modification. If the registry modification affects a LAN Server user or group, the registry update is synchronized with the local LAN Server (LS) database 66. The same security server can be installed either in a uniform DCE environment or in a LS environment as well.

FIG. 3 further illustrates a block diagram of one or two computer systems within a DCE cell 50. Computer system 52 is the DCE Security server having registry synchronization capabilities while computer system 54 is a LAN Server Enterprise (LS E) domain controller with a LS synchronization client or LS sync client 56 installed.

System 52 includes DCE security server 58, registry synchronization DLL 60, and LS synchroniztion server or LS sync server 62. System 54 further includes LS database files 66. DCE cell 50 can have system 52 also operate as the LS E domain controller by including LS synchronization client 56 in system 52 and coupled to LS synchronization server 62.

Security server 58 tests for the presence of LS registry synchronization DLL 60. If one is found, entry points are called for each type of registry modification. If the registry update involves a valid LAN server name or the LAN server modals information, it is passed to another process, which is another LS sync server, through a shared queue 68. The LS sync server 62 process propagates updates to all domain controllers (or LS sync clients 56) that register with the LS sync server 62 using registration RPC line 46. LS sync server 62 uses authenticated RPCs to propagate updates to LS sync clients 56 on update RPC line 48.

One or more LS sync servers 62 can be installed in a single cell and any number of LS domain controllers, typically one for each system within the DCE 8 of FIG. 2, can register with a single LS sync server process for receiving updates to LS user/group information in registry 44.

DCE security server 58, which can be configured as either a primary replica or a secondary replica, executes callouts to the LS registry synchronization DLL 60, which filters updates based on valid LS names and queues the updates for the LS synchronization server 62 process. The registry synchronization DLL 60 and the LS synchronization server process 62 must be installed on the same machine as the DCE security server 58.

LS synchronization server 62, which accepts event notifications from the registry synchronization DLL, manages transmissions to client domain controllers. The LS synchronization server 62 can be installed on any type of LS system computer, whether it be a LS requester or a LS server. LS synchronization server 62 maintains a list of LS clients in the registry that are allowed to register with it.

LS synchronization client 56 or the "Isesync" service receives notices from the synchronization server 62 via RPC calls and uses LS API calls to update the local database 66. When this process starts for the first time, it retrieves all the user and group information belonging to its domain from the registry and synchronizes the local databases 66. Optionally, it can also perform a full synchronization when it is restarted. The LS synchronization client 56 must be installed on a LS domain controller 54. This may be installed on the same system 52 in which the LS synchronization server 62 is installed. The LS synchronization client 56 is a LAN server service that, when configured to be installed, is automatically started with the requester service. Stopping the requester service will stop the "Isesync" service as well.

In order for the "Isesync" service to make updates to a LAN server database, at least the LAN server requestor service must be started. If an enterprise domain controller is an advanced server, such as a 386 high-performance file system (HPFS) servers, and local security is installed, the "Isesync" service will be started as a privileged program by invoking the service from a privilege command file.

The security server 58 uses two different RPC interface operations for the same type of registry update. One RPC operation is invoked when the security server is running as a primary replica and the other is invoked when the security server is running as a secondary replica. Once the security server has initialized the system, it is available to accept updates to the registry.

Figure 4:
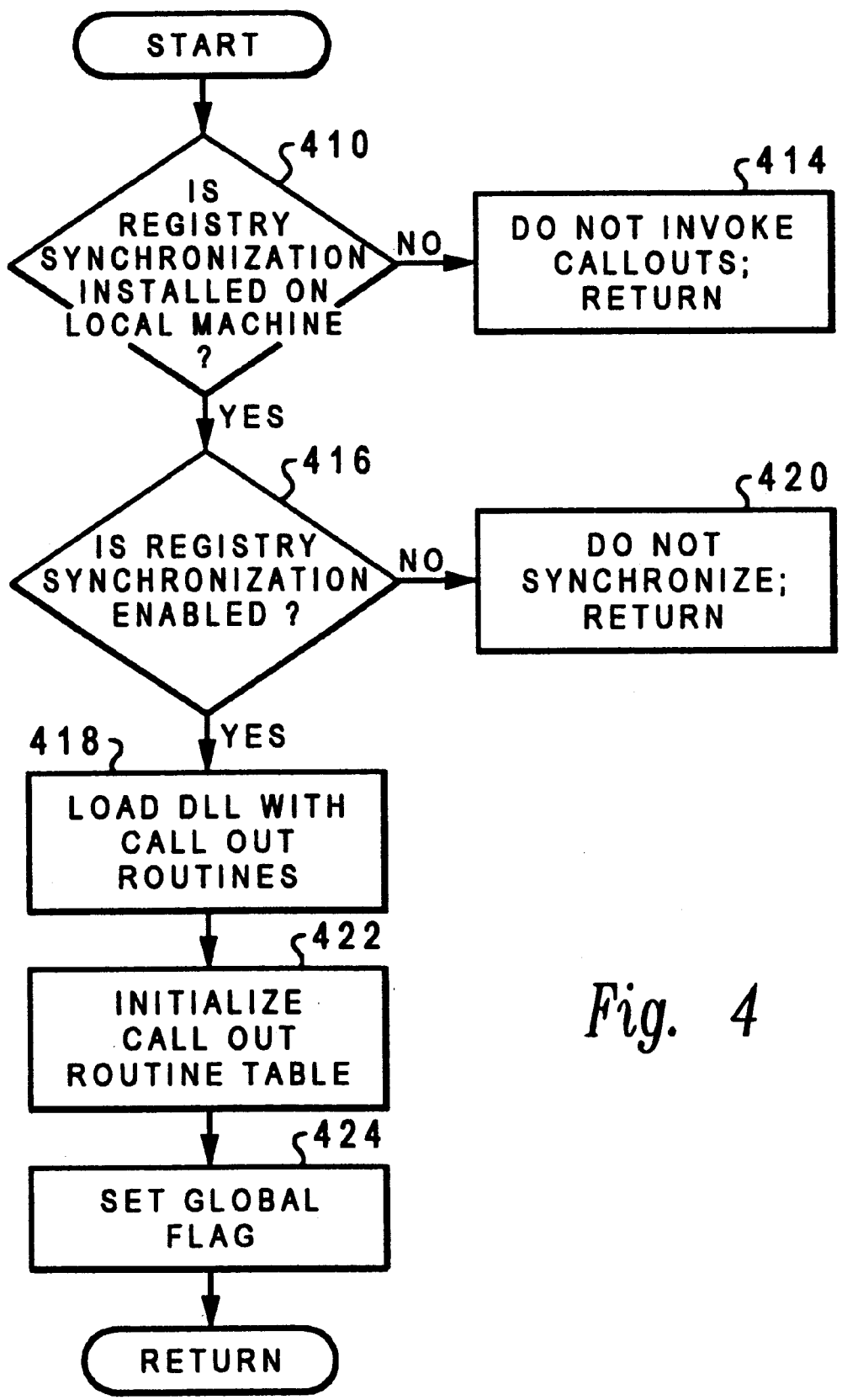
FIG. 4 depicts a flowchart of the synchronization server initialization.

During operation, when the security server daemon 58 is started as shown in the flowchart of FIG. 4, the system, at initialization time, checks if the registry synchronization DLL has been installed on the local machine (block 410). If this is so and if registry synchronization is enabled (block 416), then, in block 424, a global flag is set to indicate that the LAN server database needs to be synchronized; otherwise, the system will not invoke the callout APIs provided by the registry synchronization DLL (block 414).

If the LS database needs to be synchronized, the security server loads the DLL containing the callout routines (block 418). Otherwise, in block 420, no synchronization is performed. In order to avoid calling an API that retrieves the address of a callout routine every time an update occurs, a table of all callout routines is initialized in block 422. The server then sets the global flag in block 424.

During initialization of the DCE security server 58 if registry synchronization is required, the security server 58 (SECD) invokes the initial callout API for LS initialization. The LS initialization API starts the synchronization server process as a background process and creates shared memory objects for communicating with the LS synchronization server. The callout APIs add updates to a shared update queue, and the propagation updates task of the LS synchronization server process reads updates from the propagation queue, and propagates them to the LS synchronization clients. Once the synchronization server process is started, it is terminated only when the DCE security server is terminated. When the DCE security server is terminated, it invokes a clean up callout API to terminate the synchronization service process.

Figure 5:
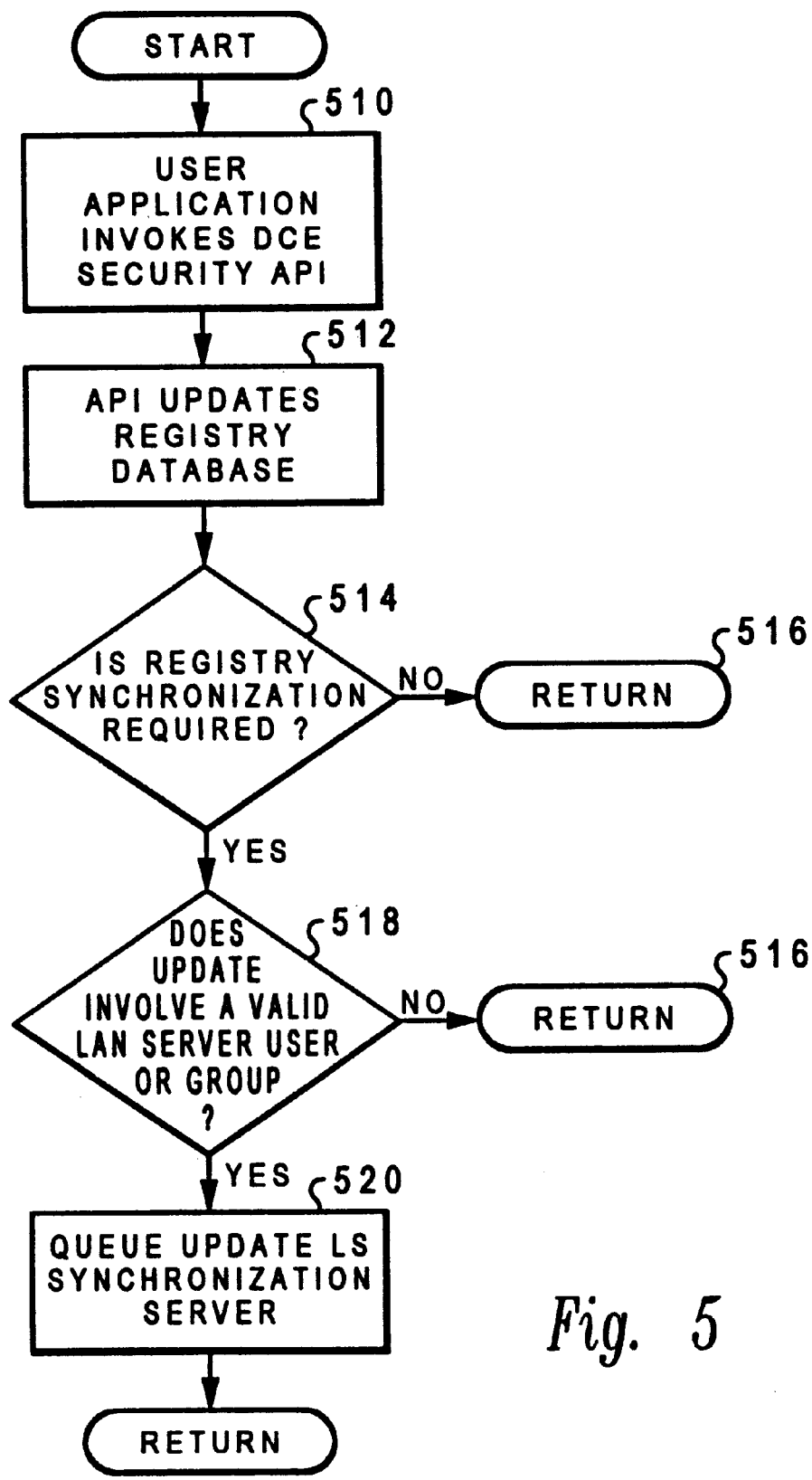
FIG. 5 is a block diagram of a flowchart depicting registry synchronization after a registry update callout.

The block diagram in FIG. 5 illustrates a flow chart of how the local DCE registry is synchronized when a user application calls a DCE security API to update the registry. In Block 510, the user application invokes DCE security API. Next, in Block 512, the API updates the registry database. In Block 514, the system determines whether the registry synchronization is required and if not, in Block 516, returns to monitoring for the next security operation. Otherwise, if, in block 518, the update involves a valid LAN Server user or group name, the appropriate update callout is invoked in block 520, which queues the update for the LS synchronization server.

When the DCE security server 58 is running as a primary replica, the first registry object that is added to the "stub" database starts at sequence number "100." The sequence number of the next registry update is one greater than the previous update. A 64-bit number is used for storing the sequence number. A registry update is known by the same sequence number to the primary replica and all its secondary replicas.

If the DCE security server process is stopped, the sequence number of the last update is saved in an update log file maintained by the DCE security server. This sequence number is used when the DCE security server is restarted. For example, if a sequence number of "971" was the sequence number of the last update when the security server was stopped, the sequence number of the first update after the security server is restarted will be "972."

When the security server 58 is selected to run as a secondary replica, it receives the entire registry when it is started for the first time after installation. The entire registry is received from the primary replica as a series of registry updates. The first update of this propagation from the primary replica has a sequence number of 100. The sequence number of the first update the secondary replica receives after the propagation is one greater than the sequence number of the masters or primary replicas last registry update before the start of the propagation. For example, if the master's sequence number of the last registry update was "2578" at the start of the propagation to a secondary replica, the first update the secondary replica will receive after the propagation is "2579."

If a secondary replica is stopped and restarted, in most cases, the primary replica will resume propagation to the secondary replica starting from the next update after the last update received by the secondary replica before it stopped. If the primary replica does not have all the updates that a secondary replica needs, it tells the secondary replica to "re-initialize" itself. This re-initialization causes the master replica to send its entire database in a bulk propagation to the secondary replica.

The secondary replica can be re-initialized after it has stopped or while is it running. When a secondary replica is re-initialized, the master sends its entire database starting from sequence No. 100.

The registry synchronization DLL 60 provides the callouts to the security server 58 for communicating with the LS synchronization server 62. If a registry modification affects a LAN Server user, group or registry policy, security server 58 invokes these callouts if registry synchronization is required. The LS synchronization DLL 60 maintains its state in a global variable and has the following states:

Registry synchronization in service: When the LS synchronization DLL 60 is in this state, the callout APIs will add updates to the log file and update the queue.

Registry synchronization initialization: The registry synchronization DLL 60 is in this state when the security server, running as a secondary replica, is in the process of receiving the "bulk" propagation updates from the primary replica. When in this state, the callouts will not process updates, i.e., all "bulk" propagation updates will be ignored by the registry synchronization DLL callouts.

Registry synchronization DLL 60 maintains a persistent copy of all valid LAN Server updates that it receives from security server 58 in an update log file also known as the registry update log file 61. Every LAN Server update is first written to the log file before it is added to the update queue 69. If security server 58 terminates without propagating all the updates in the update queue, the log file is used to build the update queue when security server 58 is restarted. An active synchronization server determination task synchronizes the update queue with the update log file periodically, and it deletes all updates from the log file that do not exist in the update queue. The format of the update log file is the same as the format of the DCE security server's log file.

Initially, the update log file is created by the LS initialization callout. The update callout APIs add updates to the log file and the active synchronization server determination task synchronizes the log file with the update queue periodically. The LS synchronization server 62 is not aware of the update log file.

The following callouts are provided by the registry synchronization DLL 60.

The LS initialization callout is called by the security server 58 during the initialization of the security server 58 and has been described above is also described more fully below.

The clean up callout is called when the security server 58 is terminating.

The LS print message is called by the security server 58 to allow registry synchronization DLL 60 to display its own message.

The PGO add callout is called by the security server 58 when a new principal, group, or organization is added to the local registry.

LS PGO delete callout is called by the security server 58 when a principal, group, or organization is deleted from the local registry.

LS PGO replace callout is called by the security server when a principal, group, or organization is modified in the local registry.

LS PGO rename callout is called by the security server 58 when a principal, group, or organization is renamed in the local registry.

LS PGO add member callout is called by the security server 58 when a principal is added to a group or organization in the local registry.

LS PGO delete member callout is called by the security server 58 when a principal is deleted from a group or organization in the local registry.

LS account add callout is called by the security server when a new account is created in the local registry.

LS account delete callout is called by the security server 58 when an existing account is deleted from the local registry.

LS account replace callout is called by the security server 58 when an existing account is modified in the local registry.

LS account rename callout is called by the security server 58 when an existing account is renamed in the local registry.

LS attribute update callout is called by the security server 58 when an extended registry attribute (ERA) is updated in the local registry.

LS policy update callout is called by the security server when policy of the registry as a whole is updated in the local registry.

LS begin reinitialization callout is called by the security server 58 at the start of the "bulk" propagation from the primary security server.

LS end reinitialization callout is called by the security server 58 at the end of the "bulk" propagation from the primary security server.

The active synchronization server determination task is created by the LS initialization callout API after successfully starting the LS synchronization callout 58. This task is created to monitor the synchronization server 62 and restart it if it terminates abnormally. Normally, the synchronization server 62 is terminated by the LS clean-up callout when the security server 58 terminates. This task also synchronizes the update queue 68 with the update log file 61. The LS synchronization server 62 ensures that updates that have been successfully propagated to all LS clients are deleted from the update log file.

The LS synchronization server 62 receives updates from security server 58 through the callout APIs and propagates the updates to the list of LS synchronization clients registered with it. LS synchronization server 62 is started by the LS initialization callout API when the security server 58 starts and normally terminates when the security server 58 terminates. LS synchronization server 62 runs as the registry principal, which is the host name of the computer system 52 on which LS synchronization server 62 is running.

A multi-value ERA containing the list of LS clients that are allowed to register with the LS synchronization server 62 is attached to the LS synchronization server's principal. The LS synchronization server 62 maintains a volatile (in memory) and persistent (on disk) list of registry synchronization clients to which updates are propagated. A client entry is added to this list whenever a LS client registers successfully with the synchronization server. It also maintains a persistent log file of the updates that need to be propagated when the LS synchronization server 62 is restarted. If the synchronization server 62 terminates normally, the log file contains updates that have not been successfully propagated to all LS clients. LS synchronization server 62 uses authenticated RPCs to propagate updates to the LS synchronization clients.

When LS synchronization server 62 is restarted or the security server 58 is restarted, LS synchronization server 62 builds the volatile LS synchronization client list from the persistent list. It also builds the update queue from the persistent log file. If the client list is not empty, at its restart, LS synchronization server 62 sends a "reconnect" RPC to all the clients. The synchronization server process does not support "bulk" propagation (propagation of the entire registry database) to the LS synchronization clients when it is driven by a secondary replica. The LS synchronization clients are responsible for the initial synchronization before registering with the synchronization server process.

Registry synchronization DLL 60 and synchronization server 62 share certain memory objects. The first memory object is the update queue. The LS initialization callout API creates the shared update queue that contains registry updates that need to be propagated to LS clients. The update queue is a "linked list" with each entry containing a specific type of registry update.

The LS initialization callout API creates a large block of "uncommitted" shared memory for the update queue. Memory is allocated and committed dynamically when a new update is added to the update queue. Memory is then de-allocated when an update is deleted from the update queue. If the update log file does not exist or if it is empty, a dummy update with sequence number "100" is added to the update queue. If the update log file is not empty, the LS initialization callout API reads updates from the log file and adds to them to the update queue.

The update callout APIs add updates to the update queue if the registry synchronization DLL's state is active (registry synchronization in service) and if there is at least one LS client in the client list.

The LS synchronization server 62 propagates updates and periodically deletes updates from the update queue that have been successfully propagated to all the LS clients.

If the secondary replica, which is driving the synchronization server is reinitialized, the LS begin reinitialization callout API deletes all entries from the update queue and adds the "dummy" empty update to the empty queue. Except for this reinitialization by the LS begin reinitialization callout, the updates in the queue are deleted only by the queue refresh task.

The address at the start of the update queue, which is stored in the shared status block, is initially set by the LS initialization callout API. The start up propagation address is only modified by the queue refresh task and the LS begin reinitialization callout API.

The address of the last update that is added to the update queue, or end of propagation address, is initially set by the LS initialization callout API. The end of propagation queue address is modified by the update callout APIs and the LS begin reinitialization callout. The queue refresh task does not modify the end of propagation queue address. When a registry update needs to be added to the queue, memory is allocated for the new update, the next entry after end of propagation queue is set to the allocated memory and end of propagation queue address is changed to point to the new update.

The sync server 62 maintains a volatile list in memory and a persistent list (as disk file) of LS clients that are currently registered with it. The persistent list is stored in the LS client list file and the volatile list is maintained as a single linked list.

Each entry in the persistent client list is represented by the following data structure:

```
typedef struct Ise_clientplist{
    char                    client_name[CNLEN+1];
    uuid_t                  client_uuid;
    char                    realm_name
                            [MAX_RELAM_LEN+1];
    unsigned short          client_state;
    unsigned short          client_ver_num;
    rs_update_seqno_t       client_last_seqno;
    rpc_binding_handle_t    client_handle;
    sec-timeval_t           last_state_time;
} Ise_clientp_list;
```

Each entry in the volatile client list is represented by the following data structure:

```
typedef struct Ise_clientv_list{
    les-clientp_list        plist;
    struct propq_entry      *client_last_update;
    struct_Ise_clientv_list *next_client;
} Ise_client_list;
``` client_name: This is the "computername" of the machine on which the client process is running. The LS sync server uses this name as the principal name for authenticating the RPC handle to the client.

client_uuid: This is the instance UUID of the LS client. The client associates this UUID with the interfaces it registers with the endpoint map. The LS sync server associates the UUID with the client binding handle 'client_handle'.

realm_name: This is the realm name of the realm associated with the LS client's domain controller. This field is used for filtering updates based on a realm.

client_state: The current communication state of the client. The "prop_updates" task propagates updates to a client only when this state is "in_service". The client can be in one of the following states:
  initializing: The client is in the process of synchronizing its entire database from registry.
  in_service: the client is up and running and updates can be propagated to the client.
  sync_error: the client failed to synchronize a registry update propagated to it. The "resume_prop" task will change this state to "in_service" every 10 minutes.
  comm_error: the client is not running or is incapable of receiving updates. When a client is in this state, the LS sync server will not propagate updates to the client.

client_ver_num: This is used by LS sync server to identify down-level clients.

client_last_seqno: This is the sequence number of the last update that was sucessfully propagated to the client. When the client first registers, this sequence number is set to the sequence number of the last update (S_end_of_propq) added to the update queue.

client_handle: This is the RPC binding handle to the LS client. The LS sync server builds this handle from the client binding handle received by the registration RPC.

last_state_time: This is the time when the client went into the "comm_error" or "initializing" state. The LS sync server will delete this client from its client list if a client is in the "comm_error" or "initializing" state for a long period of time. This time is ignored when a client is in the "in_service" state.

client_last_update: This is the address of the last update (in the update queue) that was sucessfully propagated to the client. When the client first registers, this address is set to the address of the last update (S_end_of_propq) added to the update queue. When the volatile list is built from the persistent list, this address is set to the address of the update with sequence number "client_last_seqno".

next_client: This is the pointer to the next entry in the client list.

The LS sync server provides the following RPCs to LS sync clients.

Registration RPC: An LS client calls this RPC to register with the LS sync server. The registration is rejected if the client does not exist in the ERA list of the sync server's principal. The client passes its state information through the registration RPC. If the client's state is "initializing," the sync server adds the client to its list and marks the client's state as "initializing." After the client has successfully initialized its database (net.acc and DCDB) from registry, it sends the registration RPC again with state set to "in_service". When the sync server receives the "in_service" registration request, it changes client's state to "in_service."

The client also calls the registration RPC with a "re-start" state to request the sync server to resume propagation to the client. If the state is "re-start," the client must send the sequence number and timestamp of the last update that was successfully synchronized. The sync server uses this information to determine if it can resume propagation to a client or if the client needs to re-initialize. If a client determines that its sync server has terminated, it can try to contact other sync servers in the cell by issuing a "re-start" registration RPC to a new sync server. If the state of the registration RPC is not "re-start," the sync server ignores the sequence number and timestamp of the last update.

If the state is "unregister," the sync server deletes the client from its client list.

If the state is "out_of_service," the sync server changes the client's state to "comm_error" to indicate that the client has terminated.

The LS client sends the following information through the registration RPC:

"client_name," "client_uuid," "realm_name," and "client_ver_num" of the "Ise_clientp_list" data structure.

Client's state: This is one of the following states:

initializing
in_service
re_start
unregister
out_of_service

If this state is "initializing" or "in_service," the client's "client_state" in the client list is set to this state.

The sequence number and timestamp of the last update that was successfully synchronized by the client. This is valid only for the "re_start" state.

The LS clients call the RPC API "rpc_mgmt_is_server_listening" frequently to find out if the sync server is active. If a client gets a return code other than rpc_s_ok, it assumes that the sync server is down and tries to contact another sync server. A sync server exports its binding infromation to the CDS object/.:/subsys/realms/rgysync/(sevobj_name> whose sevobj_name is the host name of the machine where the sync server is installed.

An LS client calls a synchronization complete (sync_complete) RPC after the client has finished synchronizing the last set of updates received from the sync server through the "Ise_sync_updates" RPC. The sync client passes the sequence number of the last update that was successfully synchronized and a return code which indicates whether all updates were synchronized successfully. When the sync server receives this RPC, it updates the client's "client_last_seqno" in the client list and changes the client's state "client_state" depending on the value of the return code it receives from the client. The return code sent by the client can have the following values:

rpc_s_ok: The client successfully synchronized all updates that were propagated to it in the last call.

update_error: The client failed to synchronize one or more updates from the last call.

Ise_seqno_error: The client was not expecting the updates propagated to it in the last call. The sequence nummber of the first update was lower than the sequence number of the last update that was already synchronized by the client.

The sync server process starts the following tasks.

The "prop_updates" task propagates updates from the update queue to the list of LS sync clients that are currently registered with the sync server. This task wakes up when an update is added to an empty propagation queue. Each client entry in the client list contains the address of the last update (client_last_update) that was successfully propagated to that client. The propagation queue contains updates in sequential order; the earliest update on the queue has the lowest sequence number and the most recent update has the highest sequence number. Whenever the prop_update task runs, it propagates updates to an LS sync client starting from the next update on the queue after the client's "client_last_update". If a client's "client_last_update" is the same as the last update added to the queue, there is nothing to propagate to that client. Updates that have been successfully propagated to all the registry clients will be deleted from the propagation queue by the "queue_refresh" task. The "prop_updates" task also controls the size of the propagation queue. It prevents the propagation queue from growing very large by removing updates that have not been propagated to any client for a long period of time.

The data structure, which is in C language as is all prior programming code previously recited, used for propagating multiple updates is defined as follows:

```
typedef struct {
    unsigned long num_updates;
    Ise_log_rec_t first_update;
} Ise_rgy_updates;
typedef struct Ise_log_rec_t {
    Ise_log_hdr_t upd_hdr;
    unsigned_char_t upd_data=1σ;
} Ise_log_rec_t;
typedef struct Ise_log_hdr_t {
    unsigned32       upd_reclen;
    unsigned16       upd_module;
    unsigned16       upd_op;
    rs_update_seqno_t upd_seqno;
    sec_timeval_t    upd_ts;
} Ise_log_hdr_t;
typedef struct {
    unsigned32 high;
    unsigned32 low.;
} rs_update_seqno_t;
typedef struct sec_timeval_t{
    signed32 sec;
    signed32 usec;
} sec_timeval_t;
- upd_reclen is the length of the update record in bytes,
```

-continued including the size of "Ise_log_hdr_t".
- upd_module is one of the following update modules:
    #define RS_LOG_MODULE_ACCT  0
    #define RS_LOG_MODULE_PGO   1
    #define RS_LOG_MODULE_ATTR  2
    #define RS_LOG_MODULE_PLCY  3
- upd_op identifies a specific registry update of the module
defined by "upd_module". For example, if "upd_module" is
RS_LOG_MODULE_ACCT, "upd_op" is one of the following:
    #define rs_log_acct_add_op     0
    #define rs_log_acct_delete_op  1
    #define rs_log_acct_replace_op 2
    #define rs_log_acct_rename_op 3

Each value of "upd_op" for a module corresponds to a specific registry update for that module.

upd_seqno is the sequence number of the registry update.

upd_ts is the timestamp of the registry update.

upd_data is the address of the variable length data of the registry update defined by "upd_module" and "upd_op."

The "queue_refresh" task deletes all entries from propagation queue that have been successfully propagated to all sync clients. It also deletes any clients that have been in "initializing" or "comm_error" state for a long period (one day) of time. It synchronizes the persistent client list with the volatile client list. Specifically, the "client_last_update" of each client in the client list will be updated with the current information in the volatile client list. The queue refresh task runs periodically, typically every one hour, and also when the "syncsrvr" process terminates.

The resume propagation task runs frequently and changes any clients that are in "sync_error" state to "in_service" state. A client goes into "sync_error" state if it cannot successfully synchronize a registry update and returns "sync_error" to the sync server. This task is created to reduce the network traffic when one or more clients are in "sync_error" state. The LS sync server propagates updates only to clients which are in "in_service" state.

The LS sync server process logs all activities that may be of interest to the administrator. The following events will be logged to the "syncsrv.aud" file:

Registration of a new LS client.

Unregistration of a LS client.

Re-start received from a LS client.

Sending "re-init" RPC to LS clients.

The LS client process is a LAN Server service (Isesync) that is installed on a LS E domain controller. When the "Isesync" service is configured on a LS E domain controller, it is started with the requester service and is stopped when the requester service is stopped. It runs as the principal "ibm/ibmlan/rgysync/<computername_rgyclient" and provides authenticated RPCs for receiving updates from the LS sync server process. The LS install/config program adds the "Isesync" principal to the "acct-admin" group to enable the service to retrieve all the user and group information from registry.

The LS client process registers with its primary LS sync server process (syncsrvr), which is specified in the LAN Server configuration file. It maintains a persistent state file (Isesync.st), which contains its state information and the sequence number and timestamp of the last update that was successfully synchronized.

When the Isesync service is started for the first time, it retrieves all the user and group information belonging to its realm from the registry and synchronizes the local net.acc and DCDB files. Re-synchronization can also be forced by the administrator setting the value of the "reinit_required" parameter in the configuration file to "yes". By default, "reinit_required" is set to "no". The "lsesync" service cannot be paused or continued.

If for some reason, the LS sync client needs to be stopped, the sequence number and timestamp of the last update that was successfully synchronized and its state are saved in the state file—"Isesync.st". The sequence number and timestamp of the last update are also written to the state file by the "beacon" task every 10 minutes. when the Isesync process is re-started, it reads the sequence number and timestamp of the last update from the state file and sends a "re-start" registration RPC to the LS sync server.

A resynchronization database routine 80 in FIG. 3 synchronizes all the user and group information belonging to the LS client's realm in master registry with the LS client's database (net.acc and DCDB). When a LS client is first started, before registering with its primary sync server, the client calls this routine to synchronize its net.acc and DCDB with the master registry.

The LS sync client registers the following RPCs for receiving updates from the LS sync server.

The LS sync client provides one Update RPC to the "prop_updates" task of the LS sync server. The sync server propagates one or more registry updates (up to 10 updates) at a time. The update RPC copies the registry updates to a local buffer, wakes up the "process_updates" task and returns "rpc_s_ok".

When the sync server receives "rpc_s_ok" from the update RPC, it changes the LS client's state in the client list to "updates_in_progress." The "prop_updates" task of the sync server process stops propagating updates to the client until the sync server receives the "sync_complete" RPC from the LS client.

The LS sync server sends a Re-init RPC to an LS client if it wants the client to re-initialize. For example, if the sync server's propagation queue gets out of sync. with the security server updates, it will send a "re-init" RPC to tell all clients to re-initialize. When a LS client receives this RPC, it re-synchronizes its net.acc and DCDB (database files) from the registry and registers with the LS sync server again.

The LS sync server calls a Shutdown RPC to let the client know that the "syncsrvr" process is terminating. When the client receives this RPC, it sends an alert message and logs a warning message to the error log file. The client changes the state of the LS client to "out_of service" which signals the beacon task to contact another sync server.

The LS sync server sends a Reconnect RPC to each client in its list when it is re-started. When an LS client receives this RPC, it always returns "rpc_s_ok" to the sync server. If the LS client has not yet contacted another sync server, it will re-connect with this sync server.

The LS client process starts the following tasks.

A beacon task runs frequently, about every 10 minutes, and checks to see if the LS sync server, with which the client is currently registered, is active. It calls the RPC API "rpc_mgmt_is_server_listening," which returns "rpc_s_ok" if the sync server is active. If the LS sync client returns anything other than "rpc_s_ok" from the RPC API, the client assumes that the server is down and it will try to contact another sync server from the list of sync server principals under "ibm/ibmlan/rgysync." The client issues the "re-start" registration RPC to the new sync server it wants to contact.

The beacon task writes the sequence number and timestamp of the last update that was successfully synchronized to the state file.

A reinitialize task that is awakened by the "lse_reinit_lsdb" RPC when the LS client's local database needs to be re-synchronized with the registry.

A "process_update" task processes updates received from the sync server process. The "lse_sync_update" RPC wakes up this task when one or more updates are propagated by the LS sync server process. After the updates are processed, it issues the "sync_complete" RPC to the sync server which will cause the sync server to resume propagation to this client. It sends the sequence number of the last update that was successfully synchronized with the local client's database.

The "process_update" task sends one of the the following return codes to the "sync_complete" RPC:

rpc_s_ok

All updates were synchronized successfully. The LS sync server process will update the "client_last_seqno" of the client in its client list with the sequence number sent with the "sync_complete" RPC.

update_error

The client failed to synchronize one or more updates. The server will update the "client_last_seqno" and change the client's state to "sync_error".

lse_seqno_error

The sync server propagated an update with sequence number lower than the last sequence number.

Figure 1:
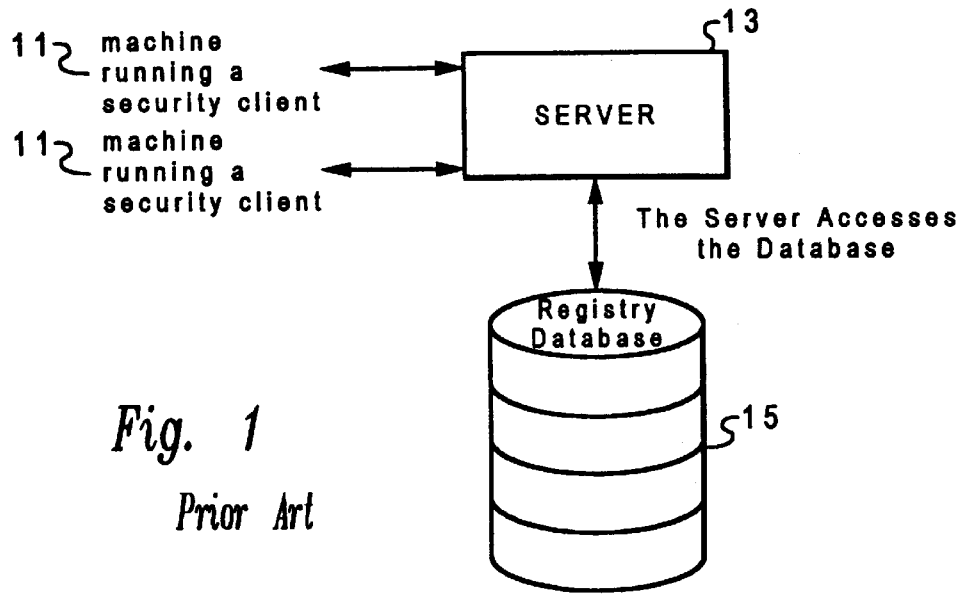
FIG. 1 is a block diagram of a prior art DCE security server.
Figure 6:
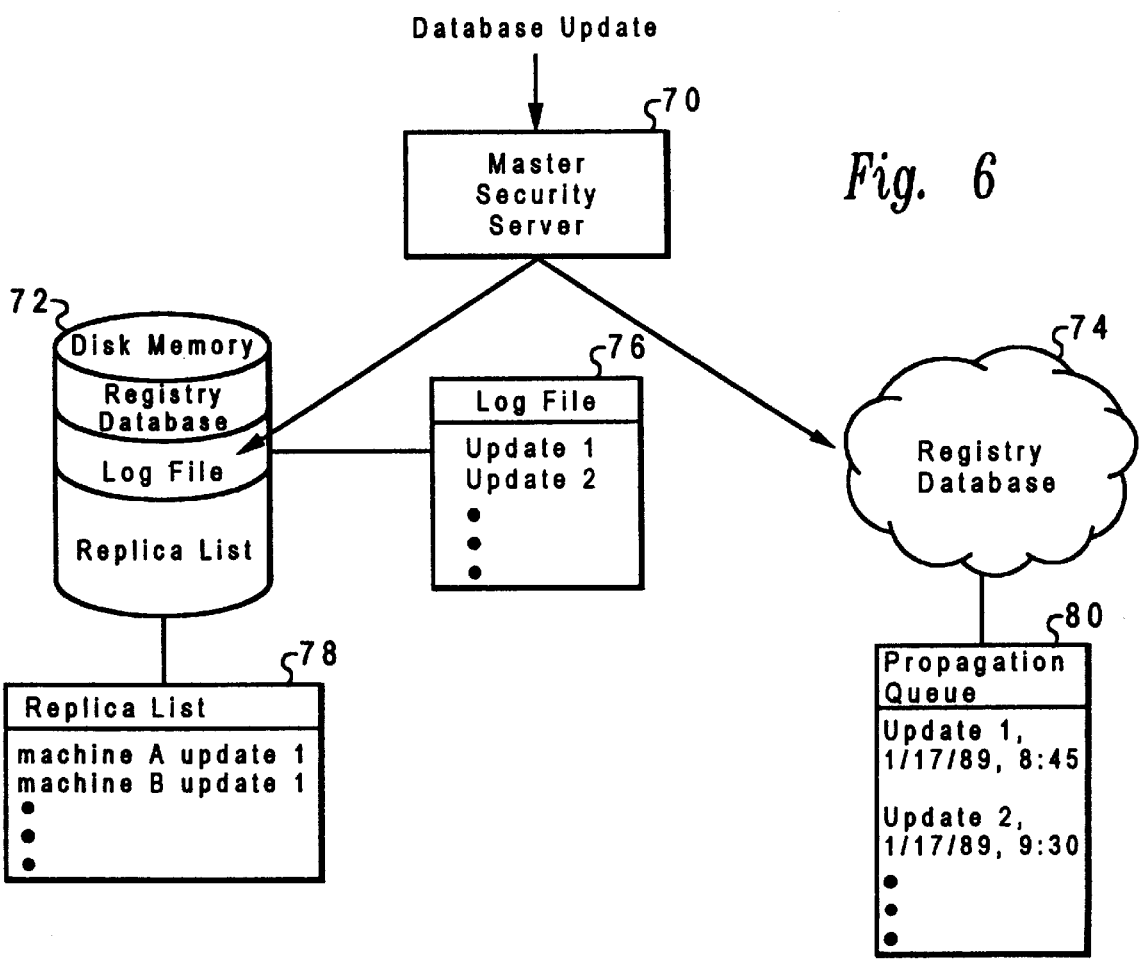
FIG. 6 depicts a block diagram of a master replica according to FIG. 3.

FIG. 6 illustrates a diagram of the master replica update process used to maintain the registry database. Again, only one master replica is allowed in the cell, which is also known as the primary replica. The master security server 70 establishes a master or primary replica and accepts updates to its registry database 72 from clients. Other replicas, typically known as slave or secondary replicas, accept only reads from clients. The master replica propagates any updates to the slave replicas. For example, either a primary or a secondary replica can provide account information to a client program. If it is desired, however, to add an account or change password information, those updates can be only handled by the master replica. The security tools that access the replicas automatically bind to the type of replica that is required for the operation they are performing.

When the primary replica (master security server 70) receives an update, in this example, a database update, it applies the updates to its database in virtual memory 74, and saves a copy of each update in a log file 76 that is stored on disk. Updates accumulate in log file 76 in sequential numerical order. If a server restarts unexpectedly, the log file ensures that no updates are lost. Periodically, the replica writes the database in virtual memory 74 to disk 72, thus bringing the disk copy up to date. Then, if the replica is a secondary replica, it clears the log file of all updates. If the replica is the master replica, it clears the log file of all updates that have been propagated to the slave replicas. Updates that have not been propagated to the secondary replicas are retained and used to reconstruct the propagation queue if necessary. For each replica in the cell, replica list 78 contains the replica's network address and ID, cell-relative name and the sequence number of the replica's last update. Further, server 70 stores a copy of each update in log file 76. This file is used in the event of a server restart to apply outstanding updates to the disk copy of the database and to recreate a propagation queue 80. The server also applies the update to the database in virtual memory and to its propagation queue 80. Periodically, server 70 writes the database in virtual memory 74 to disk 72. The master replica uses its propagation queue 80 to propagate updates to secondary replicas. When the master replica restarts, it restores propagation queue 60 from log file 76.

Only the master replica maintains a propagation queue 80 that is used to hold changes to be propagated to the secondary replicas. When the master replica receives an update, it adds to propagation queue 80 in addition to its virtual memory database 74 and its log file 76. Each update in a propagation queue 80 is identified by a sequence number and time stamp. The sequence number is used internally to control the propagation of updates to secondary replicas. The time stamp is provided to show users date and time of updates.

When a master or secondary replica starts, it initializes its database in virtual memory 74 and then applies any outstanding updates in log file 76 to its database 72. If the replica is the master replica, it also recreates propagation queue 80 from log file 76 so that any outstanding secondary updates can be propagated. This mechanism ensures that no updates are lost when a server is shut down. It is for these operations that synchronization is important.

While the invention has been particularly shown and described with reference to a preferred embodiment, it will be understood by those skilled in the art that various changes in form and detail may be made therein without departing from the spirit and scope of the invention.

We claim:

1. In a plurality of distributed computing systems, each having a local database, forming a distributed computing environment (DCE), a database synchronization system for synchronizing the plurality of local databases comprising:

a DCE system server;

a DCE registry database, coupled to the system server;

a local area network (LAN) synchronization server, coupled to the system server, for transmitting updates from one of said local database to a LAN server coupled to said local LAN synchronization server;

a LAN server synchronization library, coupled to the system server;

said LAN server, coupled to the LAN synchronization server and selected ones of the plurality of distributed computing systems forming a LAN, wherein registry modifications in the registry database affecting at least one of the plurality of local LAN databases invokes the LAN server synchronization library to synchronize the affected database.

2. The database synchronization system according to claim 1 wherein the system server further includes means for determining whether the LAN synchronization library is present and active.

3. The database synchronization system according to claim 1 wherein the LAN server synchronization library serves as a filter and queue for updates for the LAN server.

4. The database synchronization system to claim 1 wherein the LAN synchronization server accepts event notifications from the system server and supervises transmissions to the local databases.

5. The database synchronization system according to claim 4 wherein the LAN synchronization server maintains a list of LAN local databases that are allowed to register with the system server.

6. The database synchronization system according to claim 1 wherein the LAN synchronization server retrieves all user and group information belonging to its associated LAN from each local database within the distributed computing environment and synchronizes the local databases in each registry within the DCE.

7. The database synchronization system according to claim 6 wherein the system server further includes callout means that is invoked to provide updates to the local registry databases within the DCE.

8. The database synchronization system according to claim 1 wherein the system server runs either as a primary replica or as a secondary replica.

9. The database synchronization system according to claim 8 wherein the system server further comprises initialization means for generating shared memory objects for communicating with the LAN synchronization server.

10. The database synchronization system according to claim 8 wherein the system server is running as a primary replica and a first registry object is placed within a stub database and given a designated sequence number such that the sequence number of a next registry update is one greater than the previous update.

11. The database synchronization system according to claim 8 wherein the system server is running as a secondary replica and receives the entire registry database of the DCE from a primary replica and establishes a propagation queue assigning a first propagation having a given sequence number wherein additional propagations are increased by one for each subsequent propagation for registry updates.

12. The database synchronization system according to claim 1 wherein the LAN synchronization library includes an in service state for allowing callouts to add updates to a log file and update queue.

13. The database synchronization system according to claim 1 wherein the LAN synchronization library includes an initialization state when a secondary replica receives a bulk propagation update from a primary replica and does not process any updates during the receiving stage.

14. The database synchronization system according to claim 1 wherein the LAN synchronization library includes an error state when a callout fails to add an update to a log file or an update queue.

15. The database synchronization system according to claim 1 wherein the LAN synchronization library maintains a persistent copy of all valid LAN server updates received from the system server in an update log file.

16. The database synchronization server according to claim 1 further comprising means for providing security within the DCE.

17. A synchronization system for use in a distributed computing environment (DCE), comprising:
  a registry database coupled to each of a plurality of local DCE databases within each computing system within the DCE;
  a primary replica, coupled to the registry database, that synchronizes each of said plurality of local DCE databases within the DCE with the registry database, wherein each of said plurality of DCE databases is synchronized by the primary replica; and
  a secondary replica, coupled to the primary replica, that synchronizes at least one local area network (LAN) server comprising selected ones of the plurality of computing systems and their respective LAN databases with the registry database, wherein the LAN databases are synchronized by the secondary replica.

18. The synchronization system server of claim 17 wherein the primary replica comprises:
  registry synchronization callouts for a specific LAN server to be synchronized.

19. The synchronization system of claim 17 wherein the LAN server comprises:
  a LAN synchronization server, coupled to the primary replica;
  a LAN server synchronization library, coupled to the LAN synchronization server, wherein registry modifications in the registry database affecting a local database or a group database within the DCE invokes the LAN server synchronization library to synchronize the affected database.

20. The synchronization system of claim 19 wherein the synchronization system server provides security and synchronization as a DCE cell for a plurality of distributed computing systems, each having a local registry database.

21. The synchronization system according to claim 19 further comprising means for determining whether the LAN synchronization library are present and active.

22. The synchronization system according to claim 19 wherein the LAN synchronization library serves as a filter and queue for updates for the LAN synchronization server.

23. The synchronizatin system according to claim 22 further comprising means for providing security within the DCE.

24. In a plurality of distributed computing systems, each having a local database, forming a distributed computing environment (DCE), a method for synchronizing the plurality of local databases comprising:
  providing primary communication from one computing system to another computing system and with a registry database within the DCE;
  establishing a secondary communications server for a local area network (LAN) of computing systems selected from the plurality of computing systems in the DCE;
  establishing a LAN server synchronization library;
  determining whether registry modifications in the registry database affect at least one of the plurality of local databases within the LAN;
  invoking the LAN server synchronization library to synchronize the affected database.

25. The method according to claim 24 wherein the step of establishing the LAN server synchronization library further includes the step of determining whether the LAN synchronization library is present and active.

26. The method according to claim 24 wherein the LAN synchronization library performs the step of:
  filtering and queueing updates for synchronization between the registry database and the local LAN databases.

27. The method according to claim 24 wherein the step of determing whether registry modifications are needed further includes the steps of:
  receiving event notifications of an update to process; and
  supervising update transmissions to the local databases from the registry database.

28. The method according to claim 24 also comprising the step of:
  maintaining a list of LAN local databases that are allowed to register with the system server.

29. The method according to claim 24 the step of invoking step comprises:
  retrieving all user and group information belonging to its associated LAN from each local database within the distributed computing environment;
  synchronizing the LAN local databases in each registry within the DCE with the user and group information.

30. The method according to claim 29 wherein the LAN synchronizing step further comprises the step of:
  invoking a callout to provide updates to the local registry databases within the DCE.

31. The method according to claim 24 wherein the step of providing primary communication comprises the step of:
generating shared memory objects for communicating with the secondary communications server.

32. The method according to claim 24 wherein the providing primary communication steps comprises:
establishing the primary communications as a primary replica;
placing a first registry object within a stub database with given a designated sequence number such that the sequence number of a next registry update is one greater than the previous update.

33. The method according to claim 24 wherein the establishing the secondary communications server step comprises:
establishing the secondary communications server as a secondary replica;
receiving the entire registry database of the DCE from a primary replica; and
establishing a propagation queue assigning a first propagation having a given sequence number wherein additional propagations are increased by one for each subsequent propagation for registry updates.

34. The method according to claim 24 wherein the LAN server synchronization library maintains a persistent copy of all valid LAN server updates received from the primary communication in an update log file.

35. The method according to claim 24 further comprising: providing security within the DCE.

36. A method of synchronizing a distributed computing environment (DCE), comprising:
establishing a registry database coupled to each of a plurality of local DCE databases within each computing system within the DCE;
establishing a primary replica that synchronizes each of said plurality of local DCE databases within the DCE with the registry database, wherein each of said plurality of DCE databases is synchronized by the primary replica; and
establishing a secondary replica that synchronizes at least one local area network (LAN) server comprising selected ones of the plurality of computing systems and their respective LAN databases with the registry database, wherein the LAN databases are synchronized by the secondary replica.

37. The method of claim 36 wherein the step of establishing the primary replica comprises:
generating registry synchronization callouts for a specific LAN server to be synchronized.

38. A computer program product for use in a plurality of distributed computing systems, each having a local database, forming a distributed computing environment (DCE), the product for synchronizing the plurality of local databases comprising:
computer usable code means for providing primary communication from one computing system to another computing system and with a registry database within the DCE;
computer usable code means for establishing a secondary communications server for a local area network (LAN) of computing systems selected from the plurality of computing systems in the DCE;
computer usable code means for establishing a LAN server synchronization library;
computer usable code means for determining whether registry modifications in the registry database affect at least one of the plurality of local databases within the LAN;
computer usable code means for invoking the LAN server synchronization library to synchronize the affected database.

39. The computer program product according to claim 38 wherein the code means for establishing the LAN server synchronization library further includes computer usable code means for determining whether the LAN synchronization library is present and active.

40. The computer program product according to claim 38 wherein the LAN synchronization library includes:
computer usable code means for filtering and queueing updates for synchronization between the registry database and the local LAN databases.

41. The computer program product according to claim 38 wherein the code means for determing whether registry modifications are needed further includes:
computer usable code means for receiving event notifications of an update to process; and
computer usable code means for supervising update transmissions to the local databases from the registry database.

42. The computer program product according to claim 38 also comprising:
computer usable code means for maintaining a list of LAN local databases that are allowed to register with the system server.

43. The computer program product according to claim 38 wherein the code means for invoking comprises:
computer usable code means for retrieving all user and group information belonging to its associated LAN from each local database within the distributed computing environment;
computer usable code means for synchronizing the LAN local databases in each registry within the DCE with the user and group information.

44. The computer program product according to claim 43 wherein the LAN synchronizing code means comprises:
computer usable code means for invoking a callout to provide updates to the local registry databases within the DCE.

45. The computer program product according to claim 38 wherein the code means for providing primary communication comprises:
computer usable code means for generating shared memory objects for communicating with the secondary communications server.

46. The computer program product according to claim 38 wherein the providing primary communication code means comprises:
computer program product means for establishing the primary communications as a primary replica;
computer program product means for placing a first registry object within a stub database with given a designated sequence number such that the sequence number of a next registry update is one greater than the previous update.

47. The computer program product according to claim 38 wherein the establishing the secondary communications server code means comprises:
computer usable code means for establishing the secondary communications server as a secondary replica;
computer usable code means for receiving the entire registry database of the DCE from a primary replica; and
computer usable code means for establishing a propagation queue assigning a first propagation having a given sequence number wherein additional propagations are increased by one for each subsequent propagation for registry updates.

48. The computer program product according to claim 38 wherein the LAN server synchronization library maintains a persistent copy of all valid LAN server updates received from the primary communication in an update log file.

49. The computer program product according to claim 38 further comprising:

computer usable code means for providing security within the DCE.

50. A computer program product for synchronizing a distributed computing environment (DCE), comprising:

computer usable code means for establishing a registry database coupled to each of a plurality of local DCE databases within each computing system within the DCE;

computer usable code means for establishing a primary replica that synchronizes each of said plurality of local DCE databases within the DCE with the registry database, wherein each of said plurality of DCE databases is synchronized by the primary replica; and computer usable code means for establishing a secondary replica that synchronizes at least one local area network (LAN) server comprising selected ones of the plurality of computing systems and their respective LAN databases with the registry database, wherein the LAN databases are synchronized by the secondary replica.

51. The computer program product of claim 50 wherein the code means for establishing the primary replica comprises:

computer usable code means for generating registry synchronization callouts for a specific LAN server to be synchronized.

\* \* \* \* \*